United States Patent
Yamaguchi et al.

(10) Patent No.: US 7,258,106 B2
(45) Date of Patent: Aug. 21, 2007

(54) CONTROL SYSTEM FOR INTERNAL COMBUSTION ENGINE

(75) Inventors: Satoshi Yamaguchi, Wako (JP); Mamoru Hasegawa, Wako (JP); Hideki Sakamoto, Wako (JP); Naoto Kitayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/484,754

(22) Filed: Jul. 12, 2006

(65) Prior Publication Data
US 2007/0021901 A1    Jan. 25, 2007

(30) Foreign Application Priority Data
Jul. 20, 2005 (JP) .............................. 2005-210439

(51) Int. Cl.
*F02M 1/00* (2006.01)
*H01H 47/00* (2006.01)

(52) U.S. Cl. .................. 123/434; 123/478; 361/152

(58) Field of Classification Search ................ 123/434, 123/435, 445, 478, 480, 674, 568.11, 568.21, 123/568.26; 361/152, 154, 155
See application file for complete search history.

(56) References Cited

U.S. PATENT DOCUMENTS 5,778,857 A * 7/1998 Nakamura et al. ..... 123/406.37
6,283,096 B1 * 9/2001 Kimura ....................... 123/501
6,994,077 B2 * 2/2006 Kobayashi et al. .... 123/568.11
2002/0011240 A1 * 1/2002 Kimura ....................... 123/501

FOREIGN PATENT DOCUMENTS

JP    2004-100566 A    4/2004

* cited by examiner

*Primary Examiner*—John T. Kwon
(74) *Attorney, Agent, or Firm*—Arent Fox LLP

(57) ABSTRACT

A control system for an internal combustion engine having fuel injection valves provided in a combustion chamber and an exhaust gas recirculation mechanism. Target maximum cylinder pressure change rates are set according to the operating condition of the engine. The maximum change rate of the detected cylinder pressure and a fuel injection timing correction amount are calculated wherein a difference between the calculated maximum change rate and the target maximum cylinder pressure change rate decreases. The fuel injection timing is corrected with the fuel injection timing correction amount. The recirculation amount of exhaust gases is controlled using the calculated control value. A correction amount of the exhaust gas recirculation amount is calculated when the fuel injection timing correction amount exceeds a predetermined amount. The exhaust gas recirculation amount is controlled using the control value corrected with the correction amount of the exhaust gas recirculating amount.

6 Claims, 4 Drawing Sheets

CONTROL SYSTEM FOR INTERNAL COMBUSTION ENGINE

BACKGROUND OF THE INVENTION

1. Field of the Invention

The present invention relates to a control system for an internal combustion engine, and particularly, to a system for controlling an internal combustion engine according to a pressure in the cylinder detected by a cylinder pressure sensor.

2. Description of the Related Art

Japanese Patent Laid-open No. 2004-100566 (JP '566) discloses a fuel injection control apparatus in which the cylinder pressure (pressure in the combustion chamber) is detected by a cylinder pressure sensor, and a fuel injection amount, a fuel injection timing, and the like, are controlled according to the detected cylinder pressure. According to the disclosed apparatus, the crank angle at which the change rate of the cylinder pressure reaches a maximum value is detected, and the fuel injection timing is corrected so that the detected crank angle of the maximum cylinder pressure change rate coincides with a target value which is previously set according to the engine operating condition.

In the internal combustion engine, particularly the diesel engine, the combustion noise is rather loud. Therefore, it is important to suppress the combustion noise and to improve the fuel consumption and output characteristics of the engine. The apparatus disclosed by JP '566 performs a control wherein the maximum change rate crank angle at which a change rate of the cylinder pressure reaches the maximum value coincides with the target value. However, there remains room for improvement regarding the combustion noise since the control of the conventional apparatus does not suppress the maximum change rate of the combustion pressure.

Further, in an engine having an exhaust gas recirculation mechanism, the combustion state of fuel in the combustion chamber changes due to execution of the exhaust gas recirculation, and, accordingly, the combustion noise also changes. Therefore, the combustion noise is likely to increase due to the delay of the control of the recirculation amount of exhaust gases, particularly in the transient state of the engine operation. However, this point is not taken into consideration in the apparatus disclosed by JP '566.

SUMMARY OF THE INVENTION

The present invention was attained contemplating the above-described points, and an aspect of the present invention is to provide a control system for an internal combustion engine which appropriately controls the recirculation amount of exhaust gases according to the cylinder pressure detected by the cylinder pressure sensor to improve the fuel consumption and suppress combustion noise.

In order to attain the above aspect, the present invention provides a control system for an internal combustion engine having a fuel injection means provided in a combustion chamber of the engine for injecting fuel into the combustion chamber and an exhaust gas recirculation mechanism for recirculating exhaust gases of the engine to an intake system of the engine. The control system includes operating condition detecting means, fuel injection control means, cylinder pressure detecting means, target cylinder pressure change rate storing means, fuel injection timing correction amount calculating means, exhaust gas recirculation control means, and exhaust gas recirculation correction amount calculating means. The operating condition detecting means detects an operating condition of the engine. The fuel injection control means determines a fuel injection timing (CAIMM) according to the detected engine operating condition and executes a fuel injection through the fuel injection means. The cylinder pressure detecting means detects a cylinder pressure of the engine. The target cylinder pressure change rate storing means stores target maximum cylinder pressure change rates (DPMAXCMD) which are target values of the maximum change rate of the cylinder pressure. The target maximum cylinder pressure change rates (DPMAXCMD) are set according to the operating condition of the engine. The fuel injection timing correction amount calculating means calculates a maximum change rate parameter indicative of a maximum change rate (DPMAX) of the cylinder pressure detected by the cylinder pressure detecting means or a change rate (DPMAX') in the vicinity of the maximum change rate (DPMAX) and calculates a fuel injection timing correction amount (CAD) so that a difference ($\Delta$DP) between the calculated maximum change rate parameter and the target maximum cylinder pressure change rate (DPMAXCMD) decreases. The exhaust gas recirculation control means calculates a control value of a recirculation amount of exhaust gases through the exhaust gas recirculation mechanism according to the operating condition of the engine and controls the recirculation amount of exhaust gases using the calculated control value (GAM). The exhaust gas recirculation correction amount calculating means calculates a correction amount of the recirculation amount of exhaust gases when the fuel injection timing correction amount (CADF) exceeds a predetermined amount. The fuel injection control means corrects the fuel injection timing (CAIMM) with the fuel injection timing correction amount (CAD) and executes the fuel injection according to the corrected fuel injection timing (CAIM). The exhaust gas recirculation control means corrects the control value (GAM) with the correction amount (GECLARN) of the recirculating amount exhaust gases and controls the recirculation amount of exhaust gases using the corrected control value (GACMD).

With the above-described configuration, the maximum change rate of the detected cylinder pressure is calculated, and the fuel injection timing is corrected wherein the difference between the calculated maximum change rate parameter and the target maximum cylinder pressure change rate, set according to the engine operating condition, decreases. Further, when the correction amount of the fuel injection timing exceeds the predetermined amount, the control value of the recirculation amount of exhaust gases is corrected. Therefore, if the maximum change rate parameter calculated from the detected cylinder pressure becomes greater than the target maximum cylinder pressure change rate (i.e., the combustion noise increases), the correction amount of the fuel injection timing exceeds the predetermined amount and the recirculation amount of exhaust gases is corrected.

By correcting the recirculation amount of exhaust gases in the decreasing direction, the maximum change rate of the cylinder pressure is reduced to suppress the combustion noise. It is possible to improve the fuel consumption and to suppress the combustion noise by appropriately setting the target maximum cylinder pressure change rate.

Preferably, the exhaust gas recirculation correction amount calculating means includes learning value calculating/storing means for calculating a learning value (GECLRN) of the correction amount of the recirculation amount of exhaust gases and for storing the calculated value according to the engine operating condition. The exhaust gas recirculation correction amount calculating means retrieves the stored learning value according to the detected engine operating condition and outputs the retrieved learning value (GECLRN) as the correction amount.

With the above-described configuration, the learning value of the correction amount of the recirculation amount of exhaust gases is calculated and stored according to the engine operating condition. Further, the learning value stored according to the detected engine operating condition is retrieved. The recirculation amount of exhaust gases is corrected by the retrieved learning value. Therefore, deviation of the recirculation amount of exhaust gases from the optimal value, due to the control delay in the transient state of the engine operation, is prevented, and any increase in combustion noise is effectively suppressed.

DETAILED DESCRIPTION OF THE PREFERRED EMBODIMENTS

Preferred embodiments of the present invention will now be described with reference to the drawings.

Figure 1:
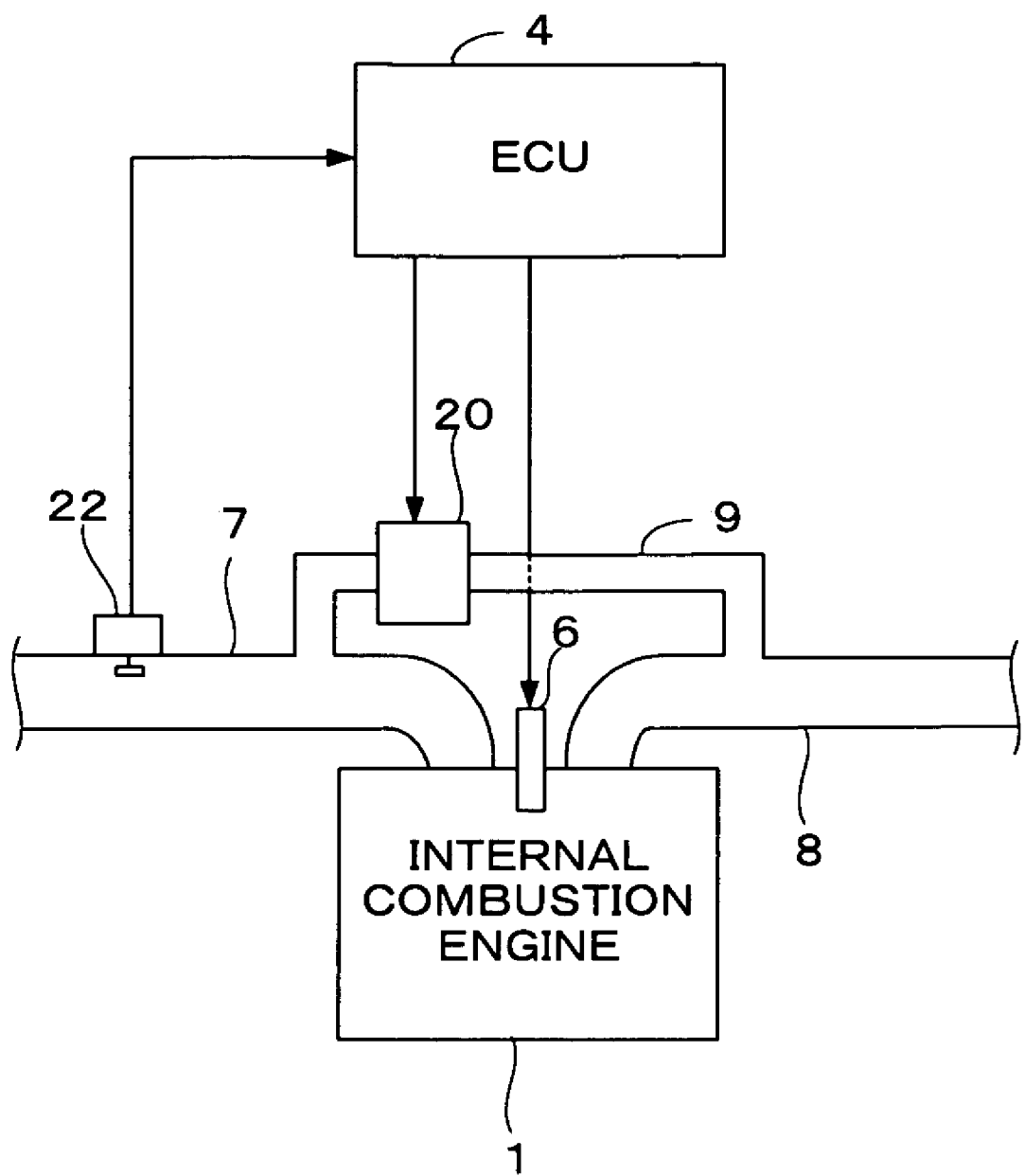
FIG. 1 is a schematic diagram illustrating an internal combustion engine and a control system therefor according to one embodiment of the present invention.
Figure 2:
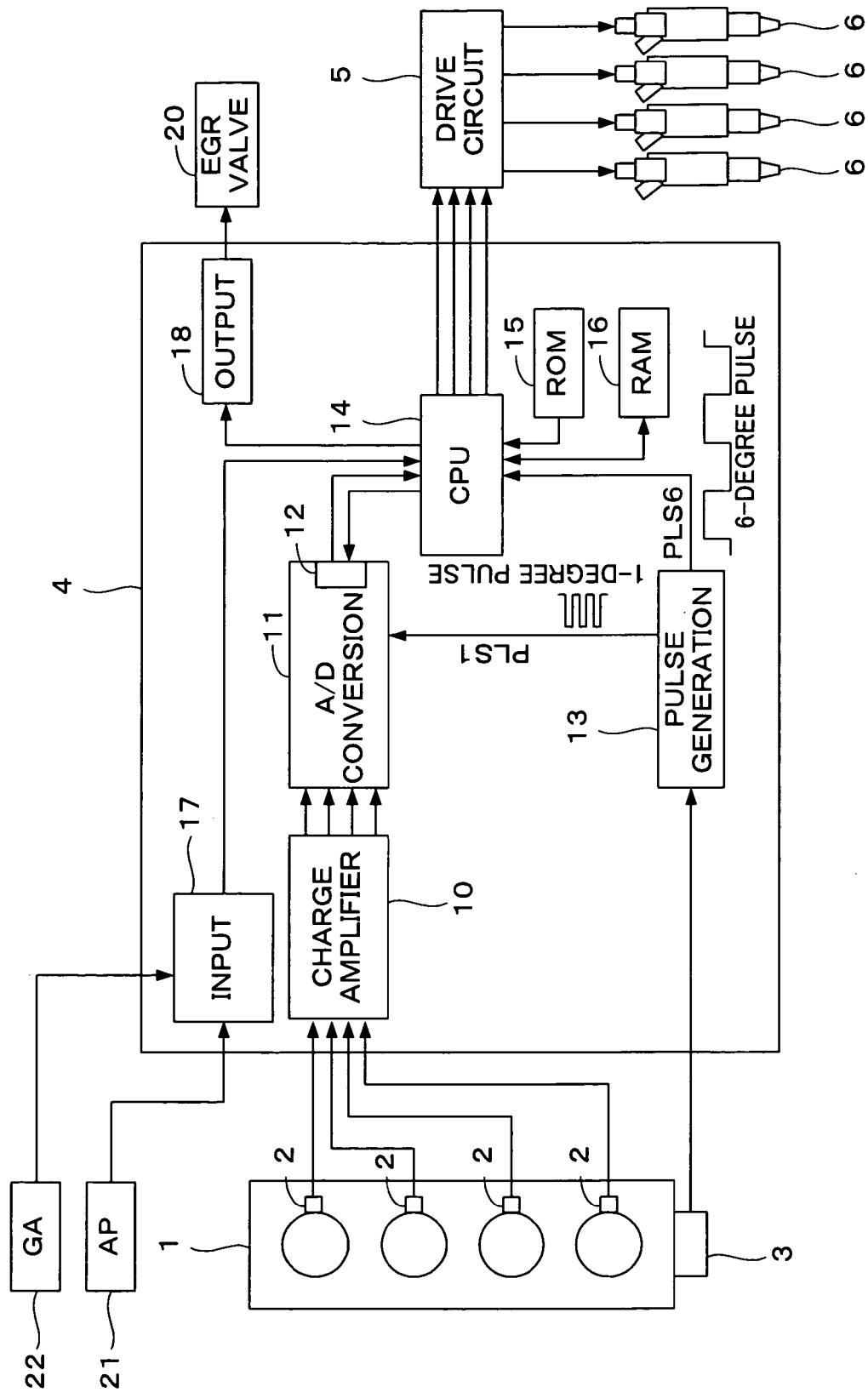
FIG. 2 is a schematic diagram illustrating a configuration of a part of the control system illustrated in FIG. 1.

FIGS. 1 and 2 are schematic diagrams illustrating a configuration of an internal combustion engine and a control system therefor according to one embodiment of the present invention. The internal combustion engine 1 (hereinafter referred to as "engine"), which has four cylinders, is a diesel engine, wherein fuel is injected directly into the cylinders. Each cylinder is provided with a fuel injection valve 6 electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 7 and an exhaust pipe 8. An exhaust gas recirculation passage 9 for recirculating a part of exhaust gases to the intake pipe 7 is located between the exhaust pipe 8 and the intake pipe 7. The exhaust gas recirculation passage 9 is provided with an exhaust gas recirculation control valve 20 (hereinafter referred to as "EGR valve") that controls the amount of exhaust gases that are recirculated. The EGR valve 20 is an electromagnetic valve having a solenoid. A valve opening of the EGR valve 20 is controlled by the ECU 4. The exhaust gas recirculation passage 9 and the EGR valve 20 form the exhaust gas recirculation mechanism.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with a glow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time). The cylinder pressure POYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every 1 degree of the crank angle, and the pulse is supplied to the ECU 4. The crank angle position sensor 3 further generates a cylinder discrimination pulse at a predetermined crank angle for a specific cylinder of the engine 1 and then supplies the cylinder discrimination pulse to the ECU 4.

An accelerator sensor 21 detects an operation amount AP of the accelerator pedal of the vehicle driven by the engine 1. An intake air flow rate sensor 22 detects an intake air flow rate GA of the engine 1. The detection signals of these sensors are supplied to the ECU 4.

A control signal of the fuel injection valve 6 located in the combustion chamber of each cylinder of the engine 1 is provided by the ECU 4 to a drive circuit 5. The drive circuit 5 is connected to the fuel injection valves 6 and supplies drive signals according to the control signal from the ECU 4 to the fuel injection valves 6. Fuel is injected into the combustion chamber of each cylinder based on a fuel injection timing in accordance with the control signal output from the ECU 4. The fuel injection amount is controlled to the value in accordance with the control signal from the ECU 4.

The ECU 4 includes a charge amplifier 10, an A/D conversion block 11, a pulse generation block 13, a CPU (Central Processing Unit) 14, a ROM (Read Only Memory) 15 for storing programs executed by the CPU 14, a RAM (Random Access Memory) 16 for storing calculation results, and the like, an input circuit 17, and an output circuit 18. The detection signal of the cylinder pressure sensor 2 is input to the charge amplifier 10. The charge amplifier 10 integrates and amplifies the input signal. The signal integrated and amplified by the charge amplifier 10 is then input to the A/D conversion block 11. The pulse signal output from the crank angle position sensor 3 is input to the pulse generation block 13.

The A/D conversion block 11, which includes a buffer 12, converts the cylinder pressure output from the charge amplifier 10 to a digital value PCYL and stores the converted digital value in the buffer 12. Specifically, a pulse signal PLS1 (hereinafter referred to as "one-degree pulse"), having a crank angle period of one degree, is supplied to the A/D conversion block 11 from the pulse generation block 13. The cylinder pressure sensor output is sampled at the intervals of the one-degree pulse PLS1 and converted to a digital value. The digital value is then stored in the buffer 12.

A pulse signal PLS6, having a crank angle period of six degrees, is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt from the CPU 14, but the CPU 14 does perform the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a duty ratio of the control signal for controlling an opening of the EGR valve 20 according to the engine operating condition and supplies the duty control signal for controlling the opening of the EGR valve 20 to the EGR valve 20 through the output circuit 18.

Figure 3:
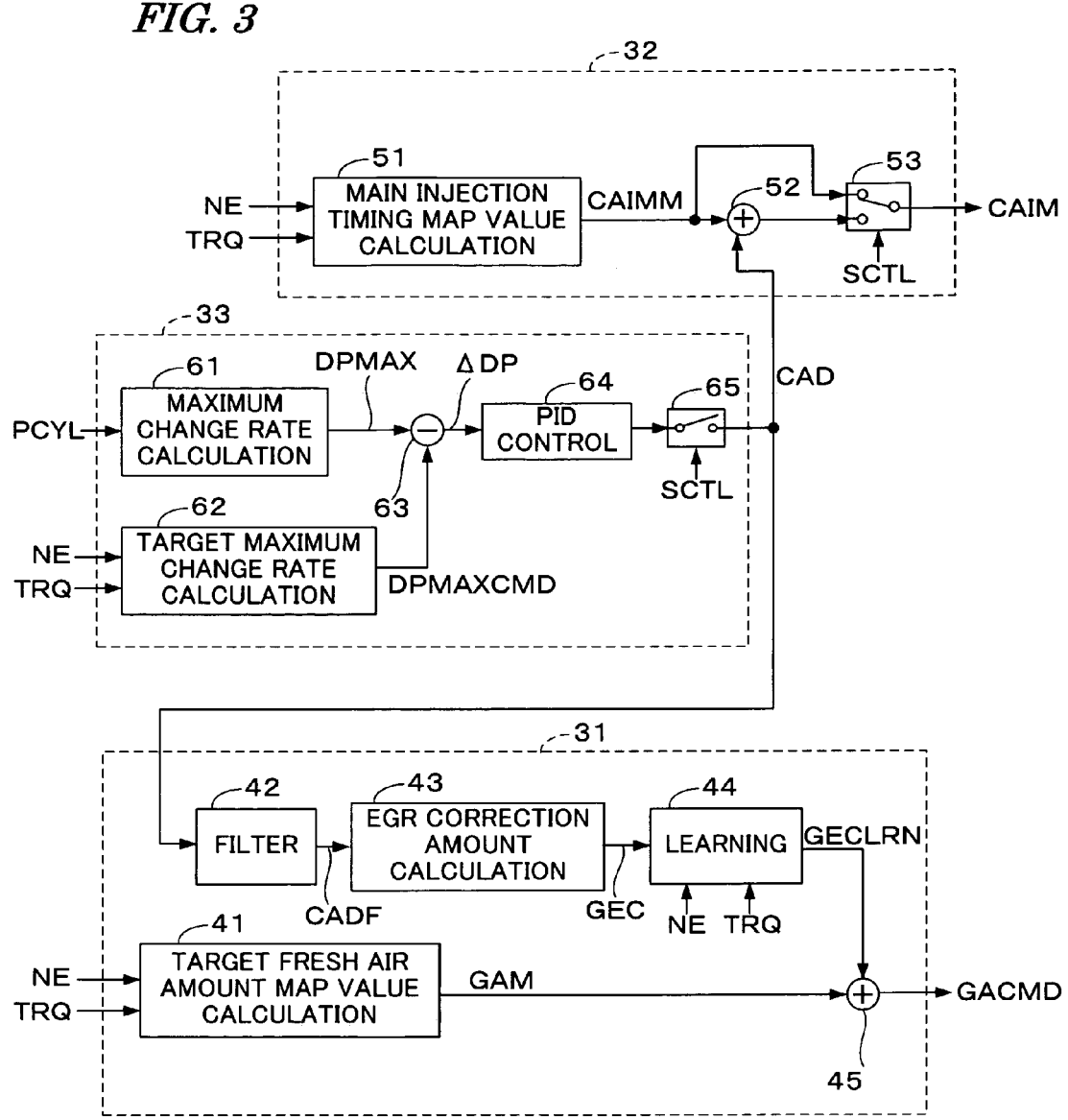
FIG. 3 is a block diagram illustrating a configuration of a module for calculating a main fuel injection timing (CAIM) and a target intake air flow rate (GACMD)

FIG. 3 is a block diagram illustrating a configuration of a module which calculates a main injection timing CAIM of the fuel injection valve 6 and a target intake air flow rate GACMD which is applied to the opening control of the EGR valve 20. The function of the module is realized by the processes executed by the CPU 14.

The module of FIG. 3 includes a target intake air flow rate calculation block 31, a main injection timing calculation block 32, and an injection timing correction amount calculation block 33. The target intake air flow rate calculation block 31 calculates the target intake air flow rate GACMD according to the engine operating condition. The main injection timing calculation block 32 calculates the main injection timing CAIM. The injection timing correction amount calculation block 33 calculates a main injection timing correction amount CAD based on the cylinder pressure PCYL.

The target intake air flow rate calculation block 31 includes a target fresh air amount map value calculation block 41, a filtering block 42, an EGR correction amount calculation block 43, a learning block 44, and an adding block 45. The target fresh air amount map value calculation block 41 retrieves a GAM map which is previously set according to the engine rotational speed NE and the demand torque TRQ to calculate the fresh air amount map value GAM. The filtering block 42 performs low pass filtering, which attenuates components of comparatively quick change in the main injection timing correction amount CAD, to output a low pass filtered main injection timing correction amount CADF.

Figure 4:
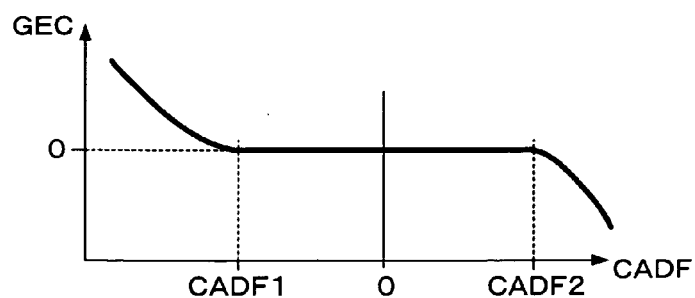
FIG. 4 illustrates a table for calculating an EGR correction amount (GEC) according to a fuel injection timing correction amount (CADF)

The EGR correction amount calculation block 43 retrieves a GEC table illustrated in FIG. 4 according to the main injection timing correction amount CADF to calculate an EGR correction amount GEC.

The GEC table is set as follows: the EGR correction amount GEC is set to "0" in the range from a first predetermined correction amount CADF1 (for example, −5-10 degrees) to a second predetermined correction amount CADF2 (for example, 5-10 degrees). The EGR correction amount GEC increases as the main injection timing correction amount CADF decreases in the range where the main injection timing correction amount CADF is less than the first predetermined correction amount CADF1. The EGR correction amount GEC decreases as the main injection timing correction amount CADF increases in the range where the main injection timing correction amount CADF is greater than the second predetermined correction amount CADF2.

The learning block 44 applies the EGR correction amount GEC to the following equation (1) to update a learning value GECLRN (i, j) of the EGR correction amount GEC. The parameters of "i" and "j" are parameters which show an engine operating region defined according to the engine rotational speed NE and the demand torque TRQ. The learning value GECLRN (i, j) is calculated corresponding to the engine operating region indicated by the parameters "i" and "j" and is stored in the map.

$$GECLRN(i, j) = a \times GEC + (1-a) \times GECLRN(i, j) \quad (1)$$

where "a" is an averaging coefficient set to a value between "0" and "1" and GECLRN (i, j) on the right side is a map set value before updating.

The adding block 45 adds the learning value GECLRN of the EGR correction amount to the target fresh air amount map value GAM to calculate the target intake air flow rate GACMD.

The CPU 14 calculates, in a process which is not shown, a duty ratio DUT of the control signal supplied to the EGR valve 20 so that the detected intake air flow rate GA coincides with the target intake air flow rate GACMD, and supplies the control signal to the EGR valve 20 in accordance with the duty ratio DUT.

The main injection timing calculation block 32 includes a main injection timing map value calculation block 51, an adding block 52, and a switching block 53.

The main injection timing map value calculation block 51 retrieves a CAIMM map which is previously set according to the engine rotational speed NE and the demand torque TRQ to calculate a main injection timing map value CAIMM. The CAIMM map is set based on the fuel of a predetermined cetane number (for example, the average cetane number in the market).

The adding block 52 adds the main injection timing correction amount CAD calculated in the injection timing correction amount calculation block 33 to the main injection timing map value CAIMM to calculate a main injection timing CAIM. In the switching block 53, the output of the adding block 52 is selected when the switching control signal SCTL is "1" (high level), while the output of the main injection timing map value calculation block 51 is selected when the switching control signal SCTL is "0" (low level).

The switching control signal SCTL is set in the process which is not shown. Specifically, when the engine 1 is in the transient operating condition, i.e., a predetermined accelerating operating condition in which the combustion noise is likely to increase (e.g., a condition wherein the maximum cylinder pressure change rate described below is equal to or greater than a predetermined threshold value), the switching control signal SCTL is set to "1" and otherwise set to "0".

The injection timing correction amount calculation block 33 includes a maximum change rate calculation block 61, a target maximum change rate calculation block 62, a subtracting block 63, a PID control block 64, and a switching block 65.

The maximum change rate calculation block 61 calculates a maximum value DPMAX of the change rate DP (=dPCYL/dCA) of the detected cylinder pressure PCYL (hereinafter referred to as "maximum cylinder pressure change rate DPMAX"). The target maximum change rate calculation block 62 retrieves a target maximum change rate map according to the engine rotational speed NE and the demand torque TRQ to calculate a target maximum change rate DPMAXCMD which is a target value of the maximum cylinder pressure change rate DPMAX.

The maximum change rates, wherein the combustion noise of the engine 1 is lower than a predetermined threshold value which is set contemplating the acceptable noise level in the market, are set in the target maximum change rate map. By using the target maximum change rate map, it is possible to obtain the maximum efficiency and suppress the combustion noise below the acceptable level.

The subtracting block 63 subtracts the target maximum change rate DPMAXCMD from the maximum cylinder pressure change rate DPMAX to calculate a deviation ΔDP. The PID control block 64 calculates a main injection timing correction amount CAD with the PID (proportional, integral, and differential) control method so that the deviation ΔDP may become "0".

That is, when the deviation ΔDP takes a positive value (DPMAX>DPMAXCMD), the main injection timing correction amount CAD is decreased. When the deviation ΔDP takes a negative value (DPMAX<DPMAXCMD), the main injection timing correction amount CAD is increased.

The switching block 65 is turned on when the switching control signal SCTL is "1" and turned off when the switching control signal SCTL is "0". Therefore, correction of the fuel injection timing and the recirculation amount of exhaust gases (target intake air flow rate GACMD) is performed only in the transient operating condition where the switching control signal SCTL is set to "1".

In the exhaust gas recirculation mechanism, the exhaust gases are recirculated to the intake pipe with some delay due to the length of the exhaust gas recirculation passage. Accordingly, combustion noise is likely to increase due to the control delay of the EGR valve 20 in the transient operating condition. Therefore, the combustion noise is effectively suppressed by correcting the recirculation amount of exhaust gases in the transient operating condition.

Figure 5:
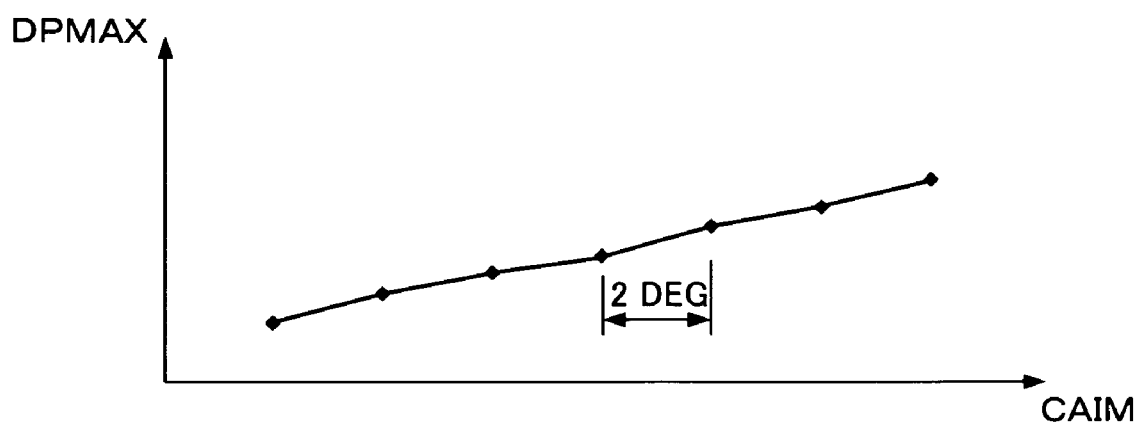
FIG. 5 illustrates a relationship between the main fuel injection timing (CAIM) and a maximum cylinder pressure change rate (DPMAX).

FIG. 5 illustrates a relationship between the main injection timing CAIM and the maximum cylinder pressure change rate DPMAX. As apparent from FIG. 5, the maximum cylinder pressure change rate of DPMAX can be controlled rather easily by changing the main injection timing CAIM.

As described above, in this embodiment, the maximum cylinder pressure change rate DPMAX is calculated, and the main injection timing map value CAIMM is corrected so that the deviation of the maximum cylinder pressure change rate DPMAX from the target maximum change rate DPMAXCMD becomes "0". Further, the target fresh air amount map value GAM is corrected in the increasing direction, thereby substantially correcting the recirculation amount of exhaust gases in the decreasing direction when the main injection timing correction amount CADF is less than the predetermined correction amount CADF1.

Accordingly, if the maximum cylinder pressure change rate DPMAX becomes greater than the target maximum change rate DPMAXCMD, and the combustion noise becomes louder than the acceptable level, the main injection timing correction amount CADF becomes less than the predetermined correction amount CADF1, and the recirculation amount of exhaust gases is corrected in the decreasing direction. Therefore, the maximum cylinder pressure change rate DPMAX is reduced and the combustion noise suppressed. Since the target maximum change rate DPMAX is set to a maximum change rate wherein the combustion noise of the engine 1 is lower than a predetermined threshold value which is set contemplating the acceptable noise level in the market, it is possible to improve the fuel consumption and to suppress the combustion noise.

The learning block 44 calculates the learning value GECLRN of the EGR correction amount corresponding to each operating region defined according to the engine rotational speed NE and the demand torque TRQ. The target intake air flow rate is corrected with the learning value GECLRN. Consequently, the recirculation amount of exhaust gases is corrected according to the learning value GECLRN. Therefore, for example, the deviation of the recirculation amount of exhaust gases from the optimal value, due to the control delay in the transient operating condition of the engine, is prevented, thereby effectively suppressing the increase in the combustion noise.

In this embodiment, the fuel injection valve 6 corresponds to the fuel injection means, the cylinder pressure sensor 2 corresponds to the cylinder pressure detecting means, the crank angle position sensor 3 and the accelerator sensor 21 correspond to the operating condition detecting means, and the ECU 4 corresponds to the fuel injection control means, the target cylinder pressure change rate storing means, the fuel injection timing correction amount calculating means, the exhaust gas recirculation control means, the exhaust gas recirculation correction amount calculating means, and the learning value calculating/storing means.

Specifically, the main injection timing calculation block 32 corresponds to the fuel injection control means. The target maximum change rate map on which the target maximum change rates DPMAXCMD are set corresponds to the target cylinder pressure change rate storing means. The injection timing correction amount calculation block 33 corresponds to the fuel injection timing correction amount calculating means. The filtering block 42, the EGR correction amount calculating block 43, and the learning block 44 correspond to the exhaust gas recirculation correction amount calculating means. The learning block 44 corresponds to the learning value calculating/storing means. Further, the target fresh air amount map value GAM corresponds to the "control value of the recirculation amount of exhaust gases". The process (not shown), which calculates the duty ratio DUT of the EGR valve control signal according to the target intake air flow rate GACMD and the detected intake air flow rate GA, corresponds to the exhaust gas recirculation control means.

The present invention is not limited to the embodiment described above, and various modifications may be made. For example, in the above-described embodiment, the cylinder pressures in all cylinders are detected, and the control for making the maximum cylinder pressure change rate DPMAX coincide with the target maximum change rate DPMAXCMD is performed corresponding to each cylinder. Alternatively, only one cylinder pressure sensor may be disposed at a specific cylinder, and the feedback control of the fuel injection timing corresponding to all cylinders may be performed based on the cylinder pressure detected by one cylinder pressure sensor. Further, instead of the maximum cylinder pressure change rate DPMAX, the cylinder pressure change rate DPMAX' which has a value in the vicinity of the maximum cylinder pressure change rate DPMAX, may be used for the feedback control of the fuel injection timing, since the exact maximum value of the cylinder pressure change rate cannot necessarily be obtained due to the sampling period.

In the above-described embodiment, an example of the 4-cylinder diesel internal combustion engine is shown. The present invention can be applied also to a diesel internal combustion engine having another number of cylinders, or a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means provided in a combustion chamber of the engine for injecting fuel into the combustion chamber, and an exhaust gas recirculation mechanism for recirculating exhaust gases of the engine to an intake system of the engine, the control system comprising:

operating condition detecting means for detecting an operating condition of the engine;

fuel injection control means for determining a fuel injection timing according to the detected engine operating condition, and executing a fuel injection through the fuel injection means;

cylinder pressure detecting means for detecting a cylinder pressure of the engine;

target cylinder pressure change rate storing means for storing target maximum cylinder pressure change rates which are target values of the maximum change rate of the cylinder pressure, the target maximum cylinder pressure change rates being set according to the operating condition of the engine;

fuel injection timing correction amount calculating means for calculating a maximum change rate parameter indicative of a maximum change rate of the cylinder pressure detected by the cylinder pressure detecting means or a change rate in the vicinity of the maximum change rate, and calculating a fuel injection timing correction amount so that a difference between the calculated maximum change rate parameter and the target maximum cylinder pressure change rate decreases;

exhaust gas recirculation control means for calculating a control value of a recirculation amount of exhaust gases through the exhaust gas recirculation mechanism according to the detected engine operating condition, and controlling the recirculation amount of exhaust gases using the calculated control value; and exhaust gas recirculation correction amount calculating means for calculating a correction amount of the exhaust gas recirculation amount when the fuel injection timing correction amount exceeds a predetermined amount, wherein the fuel injection control means corrects the fuel injection timing with the fuel injection timing correction amount, and executes the fuel injection according to the corrected fuel injection timing, and the exhaust gas recirculation control means corrects the control value with the correction amount of the exhaust gas recirculating amount, and controls the exhaust gas recirculation amount using the corrected control value.

2. The control system according to claim 1, wherein the exhaust gas recirculation correction amount calculating means includes learning value calculating/storing means for calculating a learning value of the correction amount of the exhaust gas recirculation amount, and storing the calculated value according to the detected engine operating condition, and the exhaust gas recirculation correction amount calculating means retrieves the stored learning value according to the detected engine operating condition and outputs the retrieved learning value as the correction amount.

3. A control method for an internal combustion engine having at least one fuel injection valve provided in a combustion chamber of the engine for injecting fuel into the combustion chamber, and an exhaust gas recirculation mechanism for recirculating exhaust gases of the engine to an intake system of the engine, the control method comprising the steps of:

a) detecting an operating condition of the engine;

b) determining a fuel injection timing according to the detected engine operating condition;

c) detecting a cylinder pressure of the engine;

d) calculating a maximum change rate parameter indicative of a maximum change rate of the cylinder pressure detected by the cylinder pressure detecting means or a change rate in the vicinity of the maximum change rate;

e) retrieving a target cylinder pressure change rate map according to the detected operating condition of the engine to calculate a target cylinder pressure change rate which is a target value of the maximum change rate of the cylinder pressure, the target maximum cylinder pressure change rate map being set according to the operating condition of the engine;

f) calculating a fuel injection timing correction amount so that a difference between the calculated maximum change rate parameter and the target maximum cylinder pressure change rate decreases;

g) calculating a control value of a recirculation amount of exhaust gases through the exhaust gas recirculation mechanism according to the detected engine operating condition;

h) calculating a correction amount of the exhaust gas recirculation amount when the fuel injection timing correction amount exceeds a predetermined amount;

i) correcting the fuel injection timing with the fuel injection timing correction amount;

j) executing the fuel injection according to the corrected fuel injection timing through the at least one fuel injection valve;

k) correcting the control value with the correction amount of the exhaust gas recirculating amount; and l) controlling the exhaust gas recirculation amount using the corrected control value.

4. The control method according to claim 3, further comprising the steps of calculating a learning value of the correction amount of the exhaust gas recirculation amount, and storing the calculated value according to the detected engine operating condition, wherein the stored learning value is retrieved according to the detected engine operating condition and used as the correction amount of the exhaust gas recirculation amount.

5. The control system according to claim 1, wherein the exhaust gas recirculation control means performs the correction of the control value with the correction amount of the exhaust gas recirculating amount only when said engine is in a predetermined transient operating condition.

6. The control method according to claim 3, wherein the correction of the control value with the correction amount of the exhaust gas recirculating amount in step k) is performed only when said engine is in a predetermined transient operating condition.

* * * * *